United States Patent [19]

Yoshida

[11] Patent Number: 4,890,243
[45] Date of Patent: Dec. 26, 1989

[54] PERIPHERAL MACHINE FOR PROGRAMMABLE CONTROLLER

[75] Inventor: Shinki Yoshida, Nara, Japan

[73] Assignee: Sharp Kabushiki Kaisha, Osaka, Japan

[21] Appl. No.: 273,175

[22] Filed: Nov. 14, 1988

Related U.S. Application Data

[63] Continuation of Ser. No. 196,854, May 20, 1988, abandoned, which is a continuation of Ser. No. 83,875, Aug. 10, 1987, abandoned, which is a continuation of Ser. No. 749,186, Jun. 26, 1985, abandoned.

[30] Foreign Application Priority Data

Jul. 3, 1984 [JP] Japan .............................. 59-101455[U]

[51] Int. Cl.⁴ ...................... G05B 19/02; G06F 13/20
[52] U.S. Cl. .................................. 364/550; 364/921.8; 364/940.6
[58] Field of Search ................... 364/550, 551.01, 200, 364/900

[56] References Cited

U.S. PATENT DOCUMENTS

| | | | |
|---|---|---|---|
| 3,701,113 | 10/1972 | Chace et al. | 364/200 |
| 3,753,243 | 8/1973 | Ricketts et al. | 364/200 |
| 3,827,030 | 7/1974 | Seipp | 364/900 |
| 3,833,887 | 9/1974 | Shevlin | 364/200 |
| 4,432,064 | 2/1984 | Barker et al. | 364/550 |
| 4,476,535 | 10/1984 | Loshing et al. | 364/550 |

Primary Examiner—Felix D. Gruber
Attorney, Agent, or Firm—Flehr, Hohbach, Test, Albritton & Herbert

[57] ABSTRACT

A peripheral machine for a programmable controller has a port for serial input and output to be connected to the programmable controller on a specified signal level. This port is made connectable to an input/output signal line of electronic devices which are linked together on the same signal level as the specified level so that it can be used for monitoring the communication condition of these electronic devices besides the communication with the programmable controller.

4 Claims, 2 Drawing Sheets

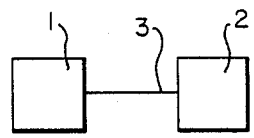
FIG.—1
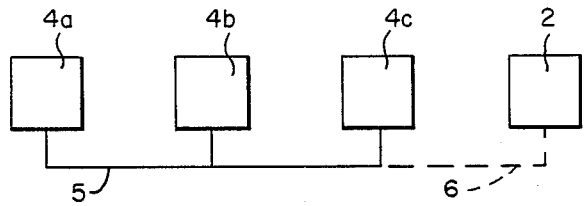
FIG.—3
```
::05? AMRG9000900
::05# AMRG9000900
```
FIG.—4
| SET | BAUD | RATE |
| | | 19200 bps? |
[SET]
FIG.—5A
| SET | BIT | LENGTH |
| | | 8 bit? |
[RESET]
FIG.—5B
| SET | BIT | LENGTH |
| | | 9 bit? |
[SET]
FIG.—5C

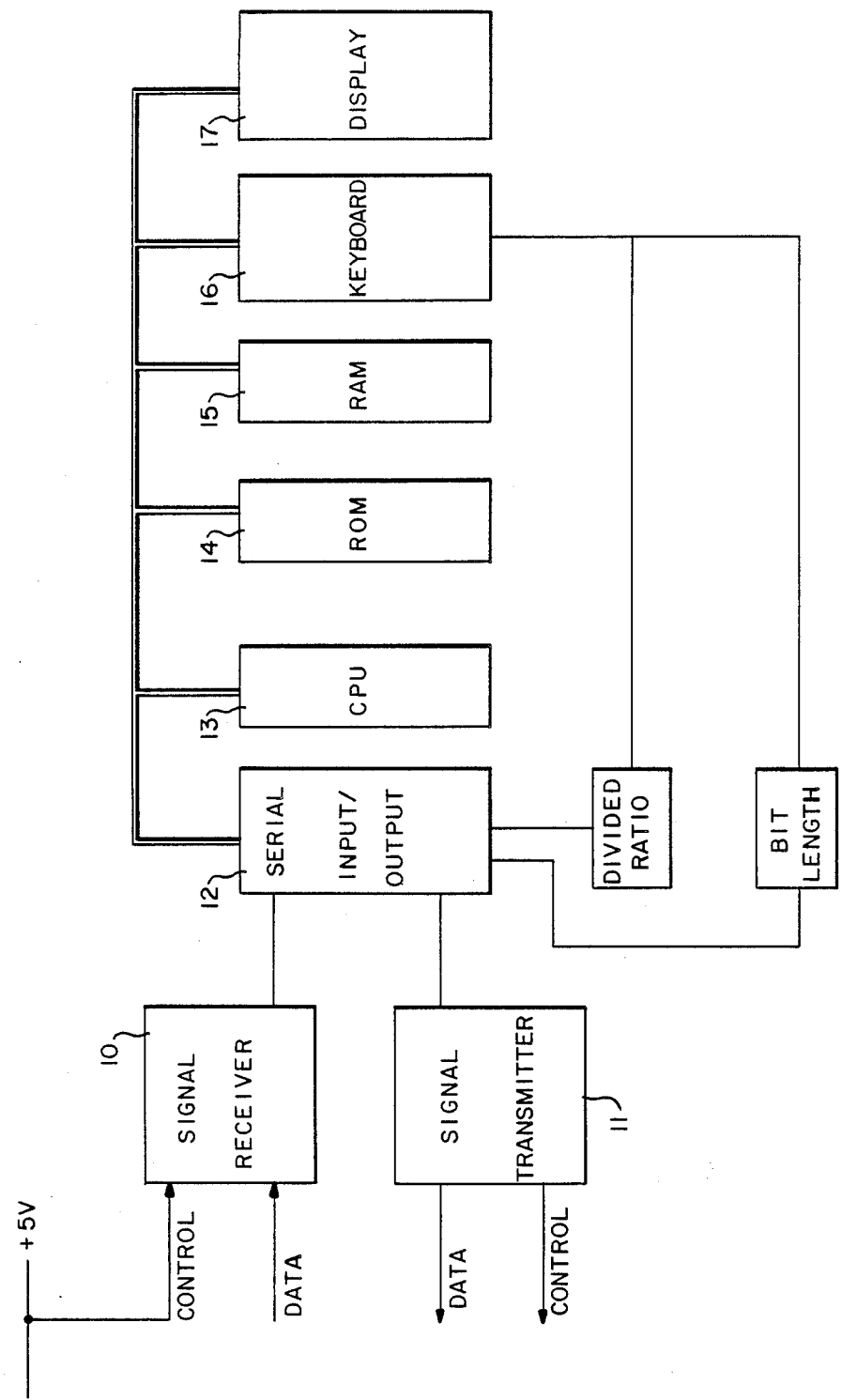

PERIPHERAL MACHINE FOR PROGRAMMABLE CONTROLLER

BACKGROUND OF THE INVENTION

This is a continuation of Ser. No. 196,854 filed on May 20, 1988 to be abandoned, which is a continuation of Ser. No. 83,875 filed Aug. 10, 1987, now abandoned, which is a continuation of 749,186 filed June 26, 1985, now abandoned.

This invention relates to a peripheral machine for a programmable controller such as a programmer.

A peripheral machine for a programmable controller is provided with a port for serial input and output through which it is connected to and exchanges information with the programmable controller. Inexpensive and simple machines have not been available, however, for checking whether communications of initial conditions are being carried out correctly among the individual devices which are linked by a communication line. It is therefore an object of this invention to provide a peripheral machine for a programmable controller with an additional capability of checking the status of communication among the other electronic devices which are also linked to the same programmable controller.

SUMMARY OF THE INVENTION

Stated briefly, the above and other objects of the present invention are achieved by providing a peripheral machine for a programmable controller having a port for serial input and output and connected to the programmable controller on a specified signal level, wherein the aforementioned port is not only connectable to the serial input and output signal lines of electronic devices which are linked also on the same signal level as the aforementioned specified level but also provided with a means for monitoring the communication status among these electronic devices.

DESCRIPTION OF THE DRAWINGS

The foregoing objects and invention will be more clearly understood from the following description in which the accompanying drawings are given by way only of illustration and not for limiting the scope of the invention.

FIG. 1 is a schematic showing a peripheral machine of the present invention linked to a programmable controller.

FIG. 2 is a block diagram of a communication monitor according to the present invention.

FIG. 3 is a schematic showing the monitor of FIG. 2 connected to a line which links electronic devices.

FIG. 4 is a plan view of the display section of the monitor of FIG. 2.

FIG. 5(A) through FIG. 5(C) are examples of display on the display section of FIG. 4.

DETAILED DESCRIPTION OF THE INVENTION

FIG. 1 shows schematically a peripheral machine 2 of the present invention for a programmable controller 1 in the condition of general use. They are connected by means of a line 3 of signal level RS422 and specified information is transmitted through this line 3.

FIG. 2 is a block diagram of a communication monitor (as a specific example of the peripheral machine 2) according to one embodiment of the present invention.

A low level control signal is switched to a high level signal by means of a bias potential of specified voltage such as 5 V and outputted from a signal receiver section 10. A central processing unit (CPU) 13 accepts the control signal through a serial input/output section 12. ROM 14 is for storing control programs. It stores a program which will operate the CPU 13 as an ordinary programmable controller if the control signal is low level and as a monitor if the outputted control signal is high level, inputting data into the CPU 13 from other computers through the signal receiver section 10 and the serial input/output section 12. In other words, if the control signals outputted from the signal receiver section 10 is high level, the CPU 13 does not function as a programmable controller but operates simply as a multi-drop for inputting data from the terminals of many other computers. Thus, it is the control program stored in the ROM 14 that determines whether the CPU 13 should operate as a programmable controller or as a monitor. RAM 15 exchanges signals with the CPU 13 to perform computations for monitoring the communication status. Numeral 11 indicates a signal transmitter adapted to transmit data and control signals to other programmable controllers when the CPU 13 functions as a programmable controller. Numeral 16 indicates a keyboard which includes number keys as well as SET and RESET keys. Frequency division ratio (speed of communication) and bit length are set by the CPU 13 according to the input from the number keys. Numeral 17 indicates a display means adapted to display monitor data on the communication conditions.

When the communication monitor 2 of the present invention is connected as shown by a dotted line 6 in FIG. 3 to a serial input/output signal line 5 for computers 4a, 4b and 4c which are linked together, it can check the communication condition among these computers. In the above, the serial input/output signal line 5 is assumed to be RS422 of the same signal level as the line 3 mentioned above.

The peripheral machine 2 can be used to monitor the rising of the system composed of the aforementioned computers 4a, 4b and 4c and the speed of communication on the line 5, bit length, etc. can also be freely set by a simple keyboard operation, the keyboard 16 being installed on the main body of the peripheral machine 2.

FIG. 4 shows an example of display of communication condition at a display section 17 of the peripheral machine 2. The display consists of two lines, the upper line showing a communication command and the lower line showing a response to the command. Communication speed and bit length are set by a key input from the keyboard 16 in response to an operation directive.

FIGS. 5(A) through 5(C) show relationships between the display on the aforementioned display section 17 and the key operation on the keyboard 16. FIG. 5(A) shows a situation where communication speed "BAUD RATE" is set. If the SET key is pressed at this moment, the speed of 19200 bps will be set. If the RESET key is pressed instead, a question, for example, may be displayed whether it should be set to 19400 bps. If the SET key is pressed thereupon, the speed of 19400 bps will be selected.

FIG. 5(B) shows an example situation wherein the RESET key is pressed to the question whether the bit length of 8 bits should be selected, thus rejecting this selection. FIG. 5(C) shows another example wherein the SET key is pressed to a question regarding the selection of 9 bits as bit length, whereby accepting this selection.

In summary, not only is the peripheral machine according to the present invention provided with a port for serial input and output through which it is connected to a programmable controller on a specified signal level, but this input/output port is made connectable to the input/output signal lines of electronic devices linked together on the same signal level. Thus, this device can monitor not only its own communication with the programmable controller but also the communication conditions of these electronic devices.

Although the present invention has been described above in terms of only a limited number of embodiments, it will be apparent to those skilled in the art that many changes and modifications can be effected thereon without departing from the spirit of the present invention. Such changes and modifications should be interpreted to be also within the scope of the present invention.

What is claimed is:

1. A peripheral machine for a programmable controller comprising a signal transmitting means and a signal receiving means connected to a serial input/output signal line of external electronic devices, a control means connected to said signal transmitting and signal receiving means through a serial input/output means, and a memory means storing a control program according to which said control means operates selectively either as a programmable controller to transmit data and signals through said signal transmitting means or as a monitor to receive data and signals from said external electronic devices through said signal receiving means, depending upon the level of a signal received through said signal receiving means.

2. The peripheral machine of claim 1 wherein said memory means includes a read only memory.

3. The peripheral machine of claim 2 wherein said memory means further includes a random access memory which is connected to and exchanges signals with said control means to perform computations when said control means operates as a monitor.

4. The peripheral machine of claim 3 further comprising a display means for displaying results of said computations.

* * * * *